US011618168B2

(12) United States Patent
Song et al.

(10) Patent No.: US 11,618,168 B2
(45) Date of Patent: Apr. 4, 2023

(54) DYNAMIC REGION DIVISION AND REGION PASSAGE IDENTIFICATION METHODS AND CLEANING ROBOT (71) Applicant: ECOVACS ROBOTICS CO., LTD., Suzhou (CN)

(72) Inventors: Qingxiang Song, Suzhou (CN); Kaili Xu, Suzhou (CN); Yongkang Zhu, Suzhou (CN); Da Liu, Suzhou (CN); Yibin Zhang, Suzhou (CN); Junjie Shan, Suzhou (CN); Jinju Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 534 days.

(21) Appl. No.: 16/733,164

(22) Filed: Jan. 2, 2020

(65) Prior Publication Data
US 2020/0215694 A1 Jul. 9, 2020

(30) Foreign Application Priority Data

Jan. 3, 2019 (CN) .......................... 201910005053.5
Dec. 20, 2019 (CN) .......................... 201911327603.1

(51) Int. Cl.
G05B 15/00 (2006.01)
G05B 19/00 (2006.01)
(Continued)

(52) U.S. Cl.
CPC ............. *B25J 9/1697* (2013.01); *A47L 11/24* (2013.01); *A47L 11/4011* (2013.01);
(Continued)

(58) Field of Classification Search
CPC ...... B25J 9/1697; B25J 11/0085; A47L 11/24; A47L 11/4011; A47L 11/4061;
(Continued)

(56) References Cited

U.S. PATENT DOCUMENTS

2007/0290649 A1* 12/2007 Jones ................... G05D 1/0214
901/1
2015/0223659 A1* 8/2015 Han ..................... G05D 1/0274
134/18
(Continued)

FOREIGN PATENT DOCUMENTS

CN 104825101 A 8/2015
CN 106695790 A 5/2017
(Continued)

OTHER PUBLICATIONS

International Search Report in Application No. PCT/CN2019/129766 dated Apr. 3, 2020.
(Continued)

*Primary Examiner* — Harry Y Oh
(74) *Attorney, Agent, or Firm* — Maschoff Brennan (57) ABSTRACT Provided are dynamic region division and region passage identification methods and a cleaning robot. The dynamic region division method includes: acquiring environment information collected by a robot when working in a first region; determining whether the robot has completed a work task in the first region, when a presence of a passage entering a second region is determined based on the environment information; and complementing a boundary at the passage to block the passage, when the work task is not completed. According to the technical solution provided by the embodiment of the present application, the occurrence probability of repeated sweeping and miss sweeping is reduced, and the cleaning efficiency is high. In addition, the technical solution provided by the embodiment of the present application relies on the environment information collected during the work, rather than relying on historical map data, so that the environmental adaptability is high.

20 Claims, 5 Drawing Sheets (51) Int. Cl.
  *B25J 9/16* (2006.01)
  *B25J 11/00* (2006.01)
  *A47L 11/40* (2006.01)
  *A47L 11/24* (2006.01)
  *G06V 20/10* (2022.01)
  *G05D 1/02* (2020.01)

(52) U.S. Cl.
  CPC ....... *A47L 11/4061* (2013.01); *B25J 11/0085* (2013.01); *G05D 1/0219* (2013.01); *G06V 20/10* (2022.01); *A47L 2201/04* (2013.01)

(58) Field of Classification Search
  CPC .. A47L 2201/04; A47L 9/2852; A47L 9/2805; A47L 2201/06; G06V 20/10; G06V 20/00; G05D 2201/0215; G05D 1/0219; G05D 1/024; G05D 1/0274; G05D 1/0221; G05D 1/0251; G05D 1/0276
  See application file for complete search history.

(56) References Cited

U.S. PATENT DOCUMENTS

2017/0344013 A1* 11/2017 Haegermarck ......... A47L 9/009
2018/0210456 A1   7/2018 Uoya et al.
2019/0249991 A1   8/2019 Uoya et al.
2021/0131822 A1*  5/2021 Artes ................... G05D 1/0088

FOREIGN PATENT DOCUMENTS

| CN | 106998984 A | 8/2017 |
| CN | 107239074 A | 10/2017 |
| CN | 107368079 A | 11/2017 |
| CN | 107378953 A | 11/2017 |
| CN | 108415421 A | 8/2018 |
| CN | 108983776 A | 12/2018 |
| EP | 2908204 A1 | 8/2015 |
| WO | 2016/095966 A1 | 6/2016 |

OTHER PUBLICATIONS

Chinese Office Action dated Mar. 2, 2021 as received in application No. 201911327603.1.
Chinese Office Action dated Sep. 22, 2021 as received in application No. 201911327603.1.
Chinese Office Action dated Feb. 14, 2022 as received in application No. 201911327603.1.
European Search Report dated Apr. 7, 2022 as received in application No. 19907156.4.

* cited by examiner

DYNAMIC REGION DIVISION AND REGION PASSAGE IDENTIFICATION METHODS AND CLEANING ROBOT

FIELD

The present disclosure relates to the field of computer technology, and more particularly relates to dynamic region division and region passage identification methods and a cleaning robot.

BACKGROUND

As technology advances, mobile robots are widely used to assist humans in completing tasks such as transportation, sweeping, etc. Cleaning robots (such as sweeping robots, mopping robots, etc.) are typical applications of mobile robots. If the path or behavior plan of the robot is unreasonable, the problems such as low coverage rate and high path repetition rate may occur.

In the prior art, after the cleaning robot completes at least one cleaning task, the cleaning area is divided according to a cleaning map for next cleaning. However, the robot may not be able to perform regional cleaning well using the previous cleaning map, when the environment changes greatly.

SUMMARY

The present application provides dynamic region division and region passage identification methods and a cleaning robot capable of solving or partially solving the above problem.

An embodiment of the present application provides a dynamic region division method. The method includes:
acquiring environment information collected by a robot when working in a first region;
determining whether the robot has completed a work task in the first region, when a presence of a passage entering a second region is determined based on the environment information; and
complementing a boundary at the passage to block the passage, when the work task is not completed.

Another embodiment of the present application provides a dynamic region division method. The method includes:
acquiring an environment image collected by a robot in a first region;
collecting environment information, when an image conforming to a passage structure is identified in the environment image; and
executing passage blocking setting to divide the first region and a second region communicated through a passage, when a presence of the passage entering the second region is determined based on the environment information.

Yet another embodiment of the present application provides a cleaning robot. The cleaning robot includes: a memory and a processor; where,
the memory is used for storing programs; and
the processor is coupled with the memory and used for executing the programs stored in the memory so as to:
acquiring environment information collected by a robot when working in a first region;
determining whether the robot has completed a work task in the first region, when a presence of a passage entering a second region is determined based on the environment information; and
complementing a boundary at the passage to block the passage, when the work task is not completed.

Yet another embodiment of the present application provides a cleaning robot. The cleaning robot includes: a memory and a processor; where,
the memory is used for storing programs;
the processor is coupled with the memory and used for executing the programs stored in the memory so as to:
acquiring an environment image collected by a robot in a first region;
collecting environment information, when an image conforming to the passage structure is identified in the environment image; and
executing passage blocking setting to divide the first region and a second region communicated through a passage, when a presence of the passage entering the second region is determined based on the environment information.

Yet another embodiment of the present application provides a region passage identification method, including:
acquiring environment information collected by a robot in a first region by using a laser sensor, where the first region is adjacent to a detected second region;
identifying whether there is a gap conforming to the passage structure in the first region based on the environment information; and
if so, identifying whether the gap is the passage entering the second region from the first region in accordance with the obstacle boundaries on both sides of the left and right end points of the gap.

Yet another embodiment of the present application provides a robot. The robot includes: a memory and a processor; where,
the memory is used for storing programs; and
the processor is coupled with the memory and used for executing the programs stored in the memory so as to:
acquire environment information collected by the robot in a first region by using a laser sensor, where the first region is adjacent to a detected second region;
identify whether there is a gap conforming to the passage structure in the first region based on the environment information; and
if so, identify whether the gap is the passage entering the second region from the first region in accordance with the obstacle boundaries on both sides of the left and right end points of the gap.

In the technical solution provided by the embodiment of the present application, the environment information collected by the robot when the robot works in the first region is acquired, the presence of a passage entering the second region is determined based on the environment information, and a boundary is complemented at the passage to block the passage when it is determined that the robot has not completed the work task in the first region, thereby ensuring the principle that the robot may enter the next region to work only after the work in the single region is completed, reducing the occurrence probability of repeated sweeping and miss sweeping, and improving the cleaning efficiency. In addition, the technical solution provided by the embodiment of the present application relies on the environment information collected during working, rather than relying on historical map data, so that the environmental adaptability is high.

In another technical solution provided by the embodiment of the present application, environment image collected by the robot in the first region is acquired; environment information is acquired when an image conforming to the passage structure is identified in the environment image; and if the presence of the passage entering the second region is determined based on the environment information, the first region and the second dynamic region, which are communicated through the passage, are divided so as to divide the working area in real time. The occurrence probability of the robot shuttling back and forth across the area is reduced, the dynamic partition is realized and the cleaning efficiency is improved.

BRIEF DESCRIPTION OF THE DRAWINGS

In order to describe the technical solutions in the embodiments of the present invention or the prior art more clearly, the drawings required to be used for descriptions about the embodiments or the prior art will be simply introduced below. It is apparent that the drawings described below are some embodiments of the present invention. Those of ordinary skill in the art may further obtain other drawings according to these drawings without creative work.

DETAILED DESCRIPTION OF EXAMPLE EMBODIMENTS

When a cleaning robot, such as a sweeping robot, sweeps indoors of a house, the robot completes the sweeping task by traversing the entire floor region of the house. If different rooms cannot be distinguished for cleaning respectively, the robot may repeatedly enter and exit the same room or alternately appear between different rooms, and the cleaning task of one room may be completed only by repeatedly entering and exiting the same room, so that the cleaning efficiency is low; the phenomenon of repeated sweeping, miss sweeping and the like is indirectly caused, and even the whole house cannot be completely swept. In order to solve the above problem, rooms should be identified and cleaned according to the principle that a single room is cleaned before cleaning the next room.

There is a static division scheme in the prior art. The static division scheme is that after the cleaning robot completes at least one cleaning task, it may draw a house map of the whole house; the house map is then partitioned to divide different rooms, and the map data of the divided rooms is used by the robot for next cleaning. However, the static division scheme has poor adaptability, and the existing map data cannot be used when the environment changes.

In order to enable those skilled in the prior art to better understand the present application, the technical solution provided by various embodiments of the present application are illustrated in detail and completely in conjunction with the drawings.

In some of the processes described in the description, claims, and the above drawings of the present application, a plurality of operations occurring in a particular order are included, which may be performed out of the order herein or be performed in parallel. The sequence numbers of the operations, such as 101, 102, etc., are merely used to distinguish between the various operations, and the sequence numbers themselves do not represent any order of execution. In addition, the processes may include more or fewer operations, and the operations may be performed sequentially or in parallel. It should be noted that the expressions herein of "first", "second", etc. are intended to distinguish between different messages, devices, modules, etc., and are not intended to represent a sequential order, nor is it intended to limit that "first" and "second" are of different types. Furthermore, the embodiments described hereafter are merely a part of the embodiments of the present application and not all the embodiments. Based on the embodiments of the present application, all other embodiments obtained by those ordinarily skilled in the art without paying creative work fall within the protection scope of the present application.

Figure 1:
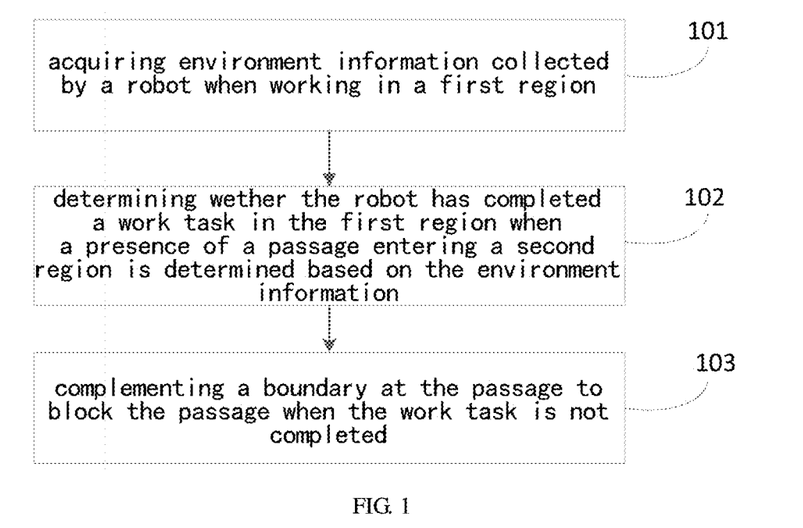
FIG. 1 is a schematic flowchart of a dynamic region division method provided by an embodiment of the present application.

FIG. 1 illustrates a flowchart of a dynamic region division method provided by an embodiment of the present application. As shown in the FIG. 1, the method provided by the present embodiment includes:

101, acquiring environment information collected by a robot when working in a first region;

102, determining whether the robot has completed a work task in the first region, when a presence of a passage entering a second region is determined based on the environment information; and 103, complementing a boundary at the passage to block the passage, when the work task is not completed.

In the above 101, the environment information may be two-dimensional point cloud data acquired after a sensor (such as a laser sensor, etc.) arranged on the robot scans obstacles in a plane; or three-dimensional point cloud data acquired by a sensor module including a vision sensor (e.g., a monocular camera, a binocular camera, a depth camera RGBD, etc.) provided on the robot, which is not particularly limited in this embodiment.

In the above 102, the passage refers to a pathway such as a door opening, through which the robot may pass and which connects two regions. Taking the door opening as an example, the door opening has certain characteristics, such as a shape characteristic and a size characteristic, etc. Therefore, in a specific implementation, whether the channel corresponding to the channel characteristics (such as the shape characteristic and the size characteristic, etc.) may be determined in the actual working scene of the robot based on the environment information.

Figure 5:
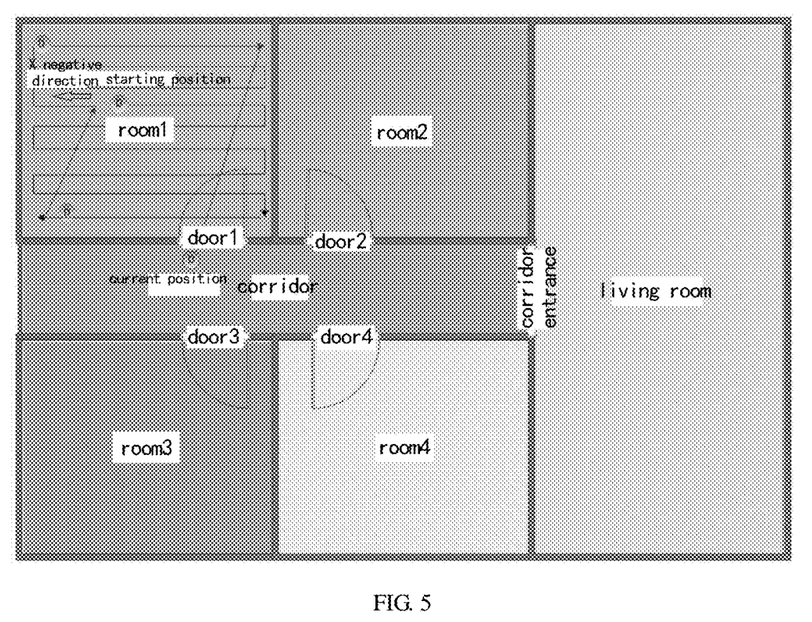
FIG. 5 is a schematic diagram of a robot continuing working in the room 1 according to a continuation scheme.

Whether the robot has completed the work task in the first region may be determined based on the work record of the robot in the first region. The work record may include, but not limited to: working mode (such as bow-shaped cleaning mode, Z-shaped cleaning mode and the like), starting position and current position of the robot. It is assumed that, as shown in FIG. 5, the working mode of the robot is the bow-shaped cleaning mode with the starting position at a position in the region map of the first region (room 1 in FIG. 5). The robot operates in bow-shaped cleaning mode from the starting position to the current position shown in FIG. 5. All the information may be recorded, and then whether the robot has completed the work task in the room 1 may be determined based on the work record of the robot in the room 1 shown in FIG. 5.

In the technical solution provided by the present embodiment, environment information collected by the robot when the robot works in the first region is acquired; the robot is prevented from entering the second region through the passage when the presence of the passage entering the second region is determined based on the environment information and it is determined that the robot does not complete the work task in the first region, thereby ensuring the principle that the robot may enter the next region to work only after the work task in the single region has been completed, reducing the occurrence probability of repeated sweeping and miss sweeping, and improving the cleaning efficiency. In addition, the technical solution provided by the present embodiment relies on the environment information collected in real time during work, rather than relying on historical map data, so the environmental adaptability is high.

In an implementable technical solution, the environment information is a point cloud model. Accordingly, the above 101 may include:

1011, collecting an environment image, when the robot works in the first region;

1012, identifying the environment image; and 1013, constructing the point cloud model for a surrounding environment of the robot by utilizing the Simultaneous Localization and Mapping (SLAM) technology, when an image conforming to a passage structure is identified in the environment image.

The environment image may be collected by a vision sensor arranged on the robot. The identifying the environment images may include, but not limited to, the following ways:

Way 1, training a depth learning training model through a large number of samples by using a depth learning method to obtain an identification model; and then taking the environment image as an input of the identification model, and executing the identification model to obtain an output result that the environment image contains the image conforming to the passage structure;

Way 2, comparing the environment image with a preset passage structure image by using an image pattern matching method; and if they are matching, determining that the environment image contains an image conforming to the passage structure; otherwise, determining that the environment image does not contain an image conforming to the passage structure.

The SLAM technology refers to that the robot determines its own spatial position in the unknown environment through the sensor information, and establishes the environment model of the space. By adopting the SLAM technology, the robot needs only to carry the sensor to view the environment around the room to construct an environment map, which is simple in operation. And with the progress of the sensor accuracy and the technology, the map accuracy constructed by the SLAM technology is gradually improved. The SLAM method mainly utilizes laser or sonar to generate a two-dimensional point cloud model, so as to construct a two-dimensional map. Because the laser scanning range is limited to a single plane, vision-based SLAM (VSLAM) technology may be adopted to generate a three-dimensional point cloud model by using a vision sensor so as to construct a three-dimensional map, in order to completely represent the complex structure of the environment.

That is, the point cloud model in the above 1013 of the present embodiment may be the two-dimensional point cloud model constructed by adopting the SLAM technology, and may further be the three-dimensional point cloud model constructed by adopting the VSLAM technology.

Furthermore, the environment information is a point cloud model, and accordingly, the method provided by the present embodiment further includes:

104, acquiring size information of a candidate structure conforming to the passage structure based on the point cloud model; and 105, determining that the candidate structure is the passage entering the second region, when the size information meets the preset size requirement.

Due to the fact that the size information is recorded in the point cloud model, the size information of the candidate structure conforming to the passage structure may be obtained based on the point cloud model. In a specific implementation, the size information may include: width, height and depth. In an implementable technical solution, a preset size requirement includes a width range, a height range and a depth range; and if the width contained in the size information is within the width range, the height within the height range and the depth within the depth range, the size information meets the preset size requirement. Through the steps 104 and 105 described above, the true passage (e.g., door opening) may be screened out, false positives may be deleted, and false identification of conditions similar to the passage structure, such as cabinets, wall paintings, etc., may be avoided.

In another implementable technical solution, the environment information is two-dimensional point cloud data collected by the laser sensor on the robot after scanning obstacles in one plane. Accordingly, the method provided by the present embodiment may further determine whether there is a passage entering the second region from the first region based on the environment information by using the following methods, where, the method for determining whether there is a passage entering the second region from the first region based on the environment information includes: first, identifying whether there is a gap conforming to the passage structure in the first region based on the two-dimensional point cloud data; and if the gap conforming to the passage structure exists, identifying whether the gap is the passage entering the second region from the first region in accordance with the obstacle boundaries on both sides of the left and right end points of the gap.

An optional manner for identifying the gap is as follows: searching for obstacles in the front region of the robot based on the two-dimensional point cloud data; if adjacent obstacles are found in the front region, calculating the angle formed by the robot and the adjacent obstacle; calculating the distance between the adjacent obstacles if the angle is larger than a set angle threshold; and determining there is a gap conforming to the passage structure between the adjacent obstacles if the distance between the adjacent obstacles meets a set distance requirement.

It should be noted that in the embodiments of the present application, the range of the front region is not limited and may be set flexibly according to the present application scenarios. Similarly, in the embodiments of the present application, the angle threshold and the distance requirement are not limited, and may be flexibly set according to the present application requirement. The front area, the angle threshold and the distance requirement may be correlated and mutually influenced. Taking an application scenario containing a door opening as an example, if the width of the door opening is 70-120 cm (centimeters), the above-mentioned front region may be within the range of 1 m (meter) in front of the robot and 90 degrees in the left and right directions. Correspondingly, the angle threshold may be 110 degrees, and the distance requirement may be a certain range, such as 70-120 cm. In this scenario, the manner for identifying the gap is as follows: searching for obstacles in the range of 1 m in front of the robot and 90 degrees to the left and right directions of the robot; if adjacent obstacles are found, calculating the angle formed by the robot and the adjacent obstacle; calculating the distance between the adjacent obstacles if the angle is larger than 110 degrees; and determining that there is a gap conforming to the passage structure between the adjacent obstacles if the distance between the adjacent obstacles is between 70 to 120 cm.

Further, in order to reduce the misjudgment rate, it is also possible to calculate the number of obstacles in specified range around the gap, and to assist in determining whether the gap between the adjacent obstacles conforms to the passage structure based on the number of the obstacles in the specified range around the gap. For different passage structures, the embodiments that assist in determining whether the gap conforms to the passage structure based on the number of the obstacles within the specified range around the gap are different. Assuming that the passage structure is a door opening structure, there are usually not many obstacles around the door opening. Then, it may be determined whether the number of the obstacles in the specified range around the gap meets a set number requirement, for example, whether the number of the obstacles is less than the set number threshold, if so, determining that the gap conforms to the passage structure; and if not, determining that the gap does not conform to the passage structure.

In one specific embodiment, the number of obstacles within the front region, the rear region, the left region, and the right region of the robot may be calculated centered on the position of the robot, as the number of obstacles within the specified range around the gap. Optionally, the ranges of the front region, the rear region, the left region and the right region may be flexibly set according to the present application scenarios, for example, a square region of 1 m*1 m, 1.5 m*1.5 m, a rectangular region of 1 m*1.5 m, a sector region with a radius of 1 m, etc. Further, the obstacle occupation ratio threshold (denoted as the first occupation ratio threshold) of the front region and the obstacle occupation ratio threshold (denoted as the second occupation ratio threshold) of the rear region may be preset. The first ratio of the number of obstacles in the front region of the robot to the sum of the number of obstacles in the front, rear, left and right regions may be calculated; and the second ratio of the number of obstacles in the rear region of the robot to the sum of the number of obstacles in the front, rear, left and right regions is calculated. By comparing the first ratio and the second ratio with the first occupation ratio threshold and the second occupation ratio threshold respectively, if the first ratio is smaller than the first occupation ratio threshold and the second ratio smaller than the second occupation ratio threshold, it is determined that the gap conforms to the passage structure; and conversely, in other cases, it is determined that the gap does not conform to the passage structure. In the embodiment, the values of the first ratio threshold and the second ratio threshold are not limited, which may be same or different, and may be flexibly set according to the present application scenarios. For example, the first ratio threshold may be but not limited to: ½, ⅓, ⅕, etc.; and the second ratio threshold may be ⅔, ⅓, ¼, ⅖, etc.

After determining that there is a gap conforming to the passage structure in the first region, it is possible to identify whether the gap is the passage entering the second region from the first region based on the obstacle boundaries on both sides of the left and right end points of the gap. Where, an optional implantation for identifying whether the gap is the passage entering the second region from the first region based on the obstacle boundaries on both sides of the left and right end points of the gape includes: determining that the gap is the passage entering the second region from the first region if the obstacle boundaries on both sides of the left and right end points of the gap meet the set boundary requirement; and determining that the gap is not the passage entering the second region from the first region if the obstacle boundaries on both sides of the left and right end points of the gap do not meet the set boundary requirement.

The boundary requirements vary depending on the passage structures. In an optional embodiment, the boundary requirement means that when the obstacle boundaries on both sides of the left and right end points of the gap is parallel or approximately parallel, the gap is a passage; and conversely, the gap is not a passage. Based on the above, whether the obstacle boundaries on both sides of the left and right end points of the gap are parallel or approximately parallel may be specifically determined. If the obstacle boundaries are parallel or approximately parallel, the gap is determined to be the passage entering the second region from the first region; and conversely, it is determined that the gap is not the passage entering the second region from the first region.

In the above embodiments, the obstacle boundaries on both sides of the left and right end points of the gap refer to the obstacle boundaries having continuity within a certain region, and generally includes a plurality of boundary points, instead of only one boundary point. In some application scenarios, the laser sensor on the robot may collect continuous obstacle boundaries in certain regions on both sides of the left and right end points of the gap, and whether the obstacle boundaries on both sides of the left and right end points of the gap are parallel or approximately parallel may be directly determined.

In other application scenarios, in view of the angle problems, the laser sensor on the robot may be unable to collect continuous obstacle boundaries in a certain region on both sides of the left and right end points of the gap, and some discrete or discontinuous boundary points are collected. For this scenario, an embodiment mode for identifying whether the gap is a passage entering the second region from the first region includes: performing expansion and corrosion in a certain region range (referred to as a first set region range) on both sides of the left and right end points of the gap to obtain continuous obstacles on both sides of the gap; tracking the boundaries of the continuous obstacles (called obstacle boundaries for short) on both sides of the gap in a second set region range, and calculating the slopes of the tracked obstacle boundaries on both sides of the gap; and determining whether the obstacle boundaries on both sides of the gap are parallel or approximately parallel according to the two slopes; and if so, determining that the gap is the passage entering the second region from the first region, and conversely, determining that the gap is not the passage entering the second region from the first region.

Optionally, it may be determined whether the difference between the two slopes is within a set difference range, and if so, it may be determined that the obstacle boundaries on both sides of the left and right end points of the gap are parallel or approximately parallel. The difference range may be flexibly set according to application requirements, for example, 0-0.01, 0-0.05, etc.

In the present embodiment, the first set region range and the second set region range are not limited, and may be set flexibly. In an optional embodiment, the robot may construct a real-time region topology map according to the two-dimensional point cloud data collected by the laser sensor, and then the first set region range and the second preset region range may be defined by the map information in the region topology map. Optionally, the region topology map may be a grid map, and then the first set region range and the second preset region range may be defined with the grid quantity in the grid map. For example, the first set region range may be 10-, 15-, 20-, or 30-grid ranges with the left and right end points of the gap as the starting points respectively, where the grid number 10, 15, 20, or 30 is merely illustrative. Correspondingly, the second preset region range may be 4 neighborhoods, 8 neighborhoods or 12 neighborhoods centered on the position of the robot.

Based on the above concept of the grid map, the boundary of obstacles may be tracked within the second preset region range. If the number of grids tracked within the second preset region range is larger than a set grid number threshold (for example, 4 grids), the obstacle boundary is determined to be tracked; and conversely, it is determined that the obstacle boundary tracking fails. In the event of failure, the partition operation may be ended.

Further and optionally, in order to reduce misjudgment rate, if it is determined that the obstacle boundaries on both sides of the gap are parallel or approximate parallel, at least one of the following determination options may further be executed:

operation 1: determining whether the vector of the obstacle boundary on at least one side of the gap, the vector of the intersection boundary of the second region and the vector of the undetected region adjacent to the second region are in the same direction;

operation 2: determining whether the angle between the obstacle boundary on at least one side of the gap and the intersection boundary of the second region is within a set angle range;

operation 3: determining whether the tracking starting point of the intersection boundary of the second region and the robot are in a same communicated region; and operation 4: determining whether the obstacles on both sides of the gap are not isolated obstacles.

If the results of the at least one of the above determination operations is "yes", it is determined that the gap is the passage entering the second region from the first region; and conversely, it is determined that the gap is not the passage entering the second region from the first region.

In operation 1, the obstacle boundary, the intersection boundary of the second region, and the undetected region adjacent to the second region refer to a boundary or region on the same side of the gap, for example a boundary or region on the left side of the gap, or a boundary or region on the right side of the gap. Where, the intersection boundary of the second region refers to the boundary between second region and the undetected region adjacent thereto, and the boundary intersects with the left end point or the right end point of the gap. The intersection boundary of the second region may be tracked in a third set region range. On the basis of the grid map, the third set region range may also be defined by the number of grids. For example, 5-, 10-, 15-, or 20-grid regions in the extension direction of the second region may be defined as the third set region range with the left or right end points of the gap as starting points. The number of grids 5, 10, 15 or 20 is merely illustrative.

In operation 1, the vector of the obstacle boundary on the left side of the gap refers to the vector directing toward the right end point from the left end point of the gap; and the vector of obstacle boundary on the right side of gap refers to the vector directing toward the left end point from the right end point of the gap. Correspondingly, the vector of the intersection boundary of the second region on the left side of the gap refers to the vector directing toward the intersection boundary of the second region on the left side of the gap from the left end point of the gap; and the vector of the intersection boundary of the second region on the right side of the gap refers to the vector directing towards to the intersection boundary of the second region on the right side of the gap from the right end point of the gap. Correspondingly, the vector of the undetected region adjacent to the second region on the left side of the gap refers to the vector directing toward the undetected region adjacent to the second region on the left side of the gap from the left end point of the gap; and the vector of the undetected region adjacent with the second region on the right side of gap refers to the vector directing towards the undetected region adjacent to the second region on the right side of the gap from the right end point of the gap.

Figure 10:
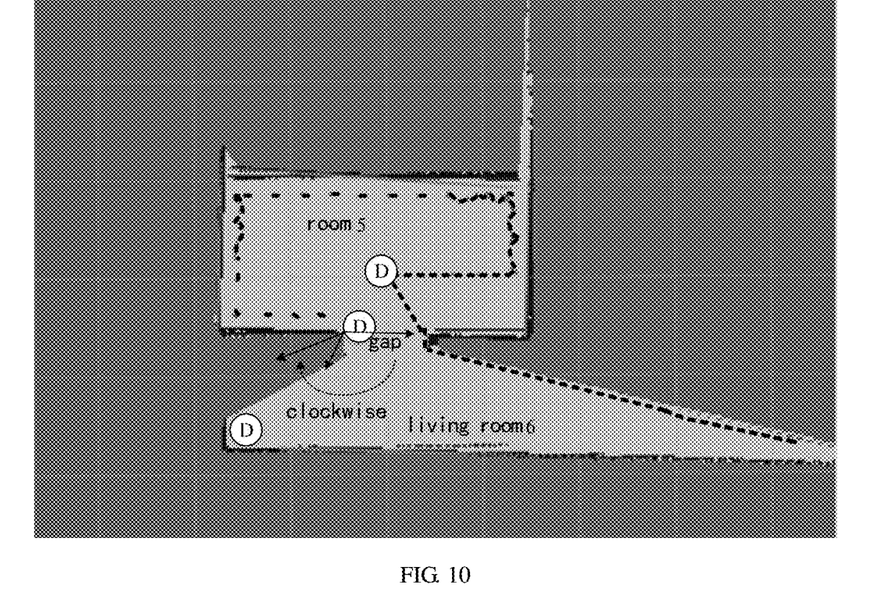
FIG. 10 is a schematic diagram illustrating a state of a region passage identification provided in an embodiment of the present application.

In operation 1, the three vectors located on the left side of the gap may be in the same direction (clockwise or counterclockwise), or the three vectors located on the right side of the gap may be in the same direction (clockwise or counterclockwise), or the three vectors located on the left side of the gap and the three vectors located on the right side of the gap may be in the same direction, respectively. Referring to FIG. 10, the three vectors on the left side of the gap (i.e., the three lines with arrows shown in FIG. 10) are in a clockwise direction.

In operation 2, it may be determined whether the angle between the obstacle boundary on the left side of the gap and the intersection boundary of the second region on the left side of the gap is within the left-side angle range; it may be further determined that whether the angle between the obstacle boundary on the right side of the gap and the intersection boundary of the second region on the right side of the gap is within the right-side angle range; and it may be also determined both that whether the angle between the obstacle boundary on the left side of the gap and the intersection boundary of the second region on the left side of the gap is within the left-side angle range, and that whether the angle between the obstacle boundary on the right side of the gap and the intersection boundary of the second region on the right side of the gap is within the right-side angle range.

The left-side angle range and the right-side angle range may be the same or different, and may be flexibly set according to application requirements. For example, the left-side angle range may be 10-85 degrees, and the right-side angle range may be 95-170 degrees, but not limited thereto.

In operation 3, the communicated region refers to a certain region including the left and right end points of the gap, and the region range may be determined flexibly. The tracking starting point of the intersection boundary of second region refers to the starting point where the intersection boundary of the second region is tracked.

In operation 4, it may be further determined whether the obstacles on both sides of the gap are the same obstacles with the gap. For example, the gap may be a door opening of a room, the obstacles on both sides of the door opening are four-sided walls in the same room, and the four-sided walls are continuous and integral, and not belong to isolated obstacles.

Further, in the case where it is determined that the above-mentioned gap is the passage entering the second region from the first region, the coordinates of the left and right end points of the gap may be outputted, so that the user or the robot may determine the position of the passage entering the second region from the first region.

No matter which method is adopted, after it is determined that there is a passage entering the second region, in a specific implementation, the step 103 of the method provided by the present embodiment may include, but not limited to, the following schemes.

In one implementable scheme, the above step 103 may specifically include:

1031, acquiring a region topology map and the position of the passage in the region topology map; and 1032, complementing the boundary to block the passage at the position in the region topology map.

In a specific implementation, the above 1032 may be specifically as follows: additionally arranging a virtual wall at the position in the region topology map; where the virtual wall is a boundary form that may block the passage, and the robot cannot pass through the virtual wall. Optionally, the virtual wall may be or may not be displayed on the region topology map. Alternatively, the above 1032 may be specifically as follows: arranging passage blocking attribute at the position in the region topology map; where passages where a blocking attribute is set are inaccessible for the robot, and setting the passage blocking attribute is another implementation way to complement the boundary.

Correspondingly, the method provided by the present embodiment may further include:

106, canceling the boundary complemented at the passage, when the work task in the first region is completed.

Likewise, the above 106 may be specifically: deleting the virtual wall arranged at the position in the region topology map; or the above 106 may be specifically: deleting the passage blocking attribute at the position in the region topology map.

Further, after the above step 103, the method provided by the present embodiment may further include:

1031', acquiring the working record of the robot in the first region;

1032', determining a continuation scheme according to the work record; and

1033', controlling the robot to continue working in the first region in accordance with the continuation scheme.

In the above 1031', the work record includes, but not limited to: working mode, starting position, starting orientation of the robot at the starting position and midway position when the robot works to the position of the passage. Correspondingly, the above step 1031' may be specifically: acquiring a region map of the first region; and determining the continuation scheme according to the region map, the working mode, the starting position, the starting orientation and the midway position.

The above-mentioned step 1032' may be specifically: planning a path returning to the starting position according to the midway position; controlling the robot to work to return to the starting position in accordance with the path; adjusting a continuation orientation after the robot returns to the starting position again according to the starting orientation; and controlling the robot to continue working in the first region in the working mode along the continuation orientation from the starting position.

Figure 4:
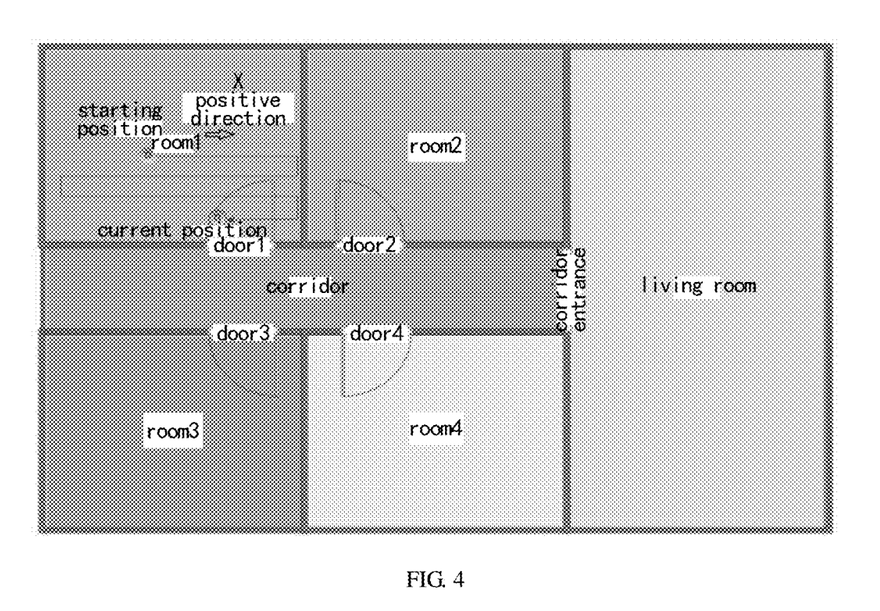
FIG. 4 is a schematic diagram of a robot working in room 1.

Referring to the examples shown in FIG. 4 and FIG. 5, the robot adopts the bow-shaped working mode. When the robot moves to the passage (at the door 1 shown in FIG. 4), the robot may continue to move in the current direction (i.e. the current orientation of the robot) to the boundary position of the room 1 and then return back from the boundary position to the starting position along a straight trajectory. As may be seen from FIG. 4, the starting direction of the robot is X positive direction, and the adjusted continuation orientation is X negative direction opposite to the X positive direction, as shown in FIG. 5. Finally, the robot is controlled to continuously work in the room 1 in an arch-shaped working mode along the X negative direction from the starting position.

Further, the method provided by the present embodiment of the present application may further include:

106', when the work task is completed, controlling the robot to move from an end position, when the work task is completed to the midway position, and controlling the robot to enter the second region through the passage after the robot arrives the midway position.

According to the above 106, the robot is prevented from entering the second region through the passage by setting the region topology map; while in the step 106', the robot is prevent from entering the second region through the passage by adjusting the control strategy of the robot.

Figure 2:
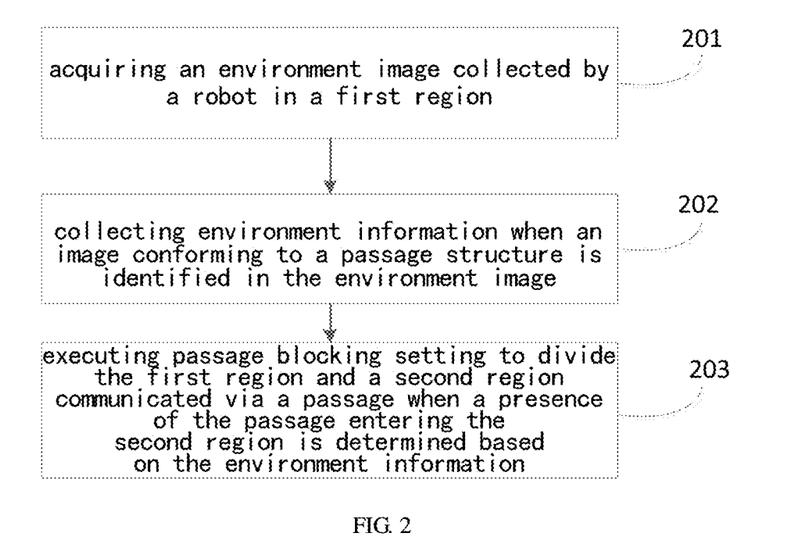
FIG. 2 is a schematic flowchart of a dynamic region division method provided by another embodiment of the present application.

FIG. 2 illustrates a flowchart of a dynamic region division method provided by an embodiment of the present application. As shown in FIG. 2, the dynamic region division method includes:

201, acquiring an environment image collected by a robot in a first region;

202, collecting environment information, when an image conforming to a passage structure is identified in the environment image; and

203, executing the passage blocking setting to divide the first region and a second region communicated through a passage, when a presence of the passage entering the second region is determined based on the environment information.

In the above 201, the environment image may be collected by the vision sensor arranged on the robot.

For the method of identifying an image conforming to the passage structure in the environment image in the above-described 202, reference is made to the corresponding contents of the above-described embodiments, which will not be described in detail here.

In the above 202, the environment information is a point cloud model, and accordingly, the step 202 may specifically include: constructing the point cloud model for the surrounding environment of the robot by utilizing the Simultaneous Localization and Mapping (SLAM) technology.

The point cloud model may be a two-dimensional point cloud model constructed based on the SLAM technology or a three-dimensional point cloud model constructed based on the VSLAM technology.

Likewise, the process of how to determine whether there is a passage entering the second region based on the environment information in the present embodiment may be referred to the related contents in the above-described embodiments, which will not be described in detail.

Further, the dynamic region division method provided by the present embodiment may further include:

204, executing passage open setting to communicate the first region and the second region through the passage, when a passage open event is monitored.

In a specific implementation, the triggering mode of the passage open event includes at least one of the following:

triggering the passage open event, when it is determined that the robot has completed the task in the first region based on a task execution condition of the robot in the first region; and triggering the passage open event after receiving a passage open instruction input by a user.

The passage open instruction may be generated after a user touches a corresponding control key on the cleaning robot, may also be generated after the user operates on the map on a man-machine interaction interface of the cleaning robot, or may be generated after the user sends a control voice to the cleaning robot.

In the technical solution provided by the present embodiment, environment image collected by the robot in the first region is acquired; the environment information is acquired when an image conforming to the passage structure is identified in the environment image; and if the presence of the passage entering the second region is determined based on the environment information, the first region and the second region which are communicated through the passage are divided so as to divide the working area in real time, the occurrence probability of the robot shuttling back and forth across the area is reduces, the dynamic partition is realized and the cleaning efficiency is improve thereby.

The technical solutions provided by the embodiments of the present application may be simply understood as follows: after an image conforming to the passage structure is identified in the environment image acquired by the vision sensor, the three-dimensional information (such as a three-dimensional point cloud model) provided by the SLAM technology is utilized to determine whether a cross-domain passage exists in the actual working scene of the robot; when the passage exists and the robot works to the position of the passage by directly controlling the robot, the robot does not pass through the passage, and the robot does not enter the next region for working until the work task in the first region is completed; and when the robot works to the position of the passage by modifying the region topology map, i.e., carrying out passage blocking setting (e.g. additionally arranging a virtual wall) at the position of the passage on the region topology map, so that when the robot works to the passage position, the robot does not pass through the passage, and the robot does not enter the next region for working until the work task in the first region is completed.

In other embodiments of the present application, a laser sensor is arranged on the robot, and the laser sensor may collect surrounding environment information, i.e., two-dimensional point cloud data, when the robot is working. The technical schemes provided by these embodiments may be simply understood as: determining whether there is a cross-domain passage in an actual working scene of the robot based on the two-dimensional point cloud data collected by the laser sensor; when the passage exists, directly controlling the robot to achieve the function that the robot will not pass through the passage when working to the position of the passage, but will enter into the next region through the passage to perform cleaning task until the task in the first region is finished; or modifying the region topology map, i.e., performing passage blocking setting at the position of the passage in the region topology map (e.g. additionally arranging a virtual wall), to achieve the function that the robot will not pass through the passage when working to the position of the passage, but will enter into the next region through the passage to perform cleaning task until the task in the first region is finished.

According to the technical solutions provided by the embodiments of the present application, historical map data is not needed. When the robot sweeps for the first time or again in a strange environment, the robot may be dynamically controlled in real time or the regional topological map may be adjusted correspondingly, so that the robot may realize dynamic partition, thereby executing tasks according to different regions, reducing the occurrence probability of repeated sweeping or miss sweeping, and improving the cleaning efficiency. In addition, according to the technical solution provided by the embodiment of the present application, the existing vision sensor on the robot is utilized without need of additional sensors, so that the cost is reduced, the structural design difficulty is reduced, and the real-time performance is good.

The technical solutions provided by the embodiments of the present application may be applied to all household robot products (such as sweeping robots) with vision sensors. The technical solutions provided by the embodiments of the present application are described below with reference to specific application scenarios.

When performing a sweeping task in a home environment, the sweeping robot may identify a passage (such as doors 1-4, corridor entrance and the like shown in FIG. 4) in real time, and carry out passage blocking setting (such as arranging a virtual wall) at the position of the passage in the indoor room topology map shown in FIG. 4 according to three-dimensional information (such as a three-dimensional point cloud model) provided by the SLAM, so that the sweeping robot may perform task by regions.

It should be noted herein that the setting of the virtual wall is dynamic. That is, assuming that the robot is currently located in the room 1 (as shown in FIG. 4), when it is determined that there is a cross-domain passage (door 1 in FIG. 4) at the moment the robot works in the room 1 to the current position in FIG. 4, only the passage corresponding to the door 1 is blocked; and after the robot completes cleaning the room 1, a passage corresponding to the door 1 needs to be opened (for example, deleting the virtual wall), so that the robot may enter the corridor through the door 1.

Figure 3:
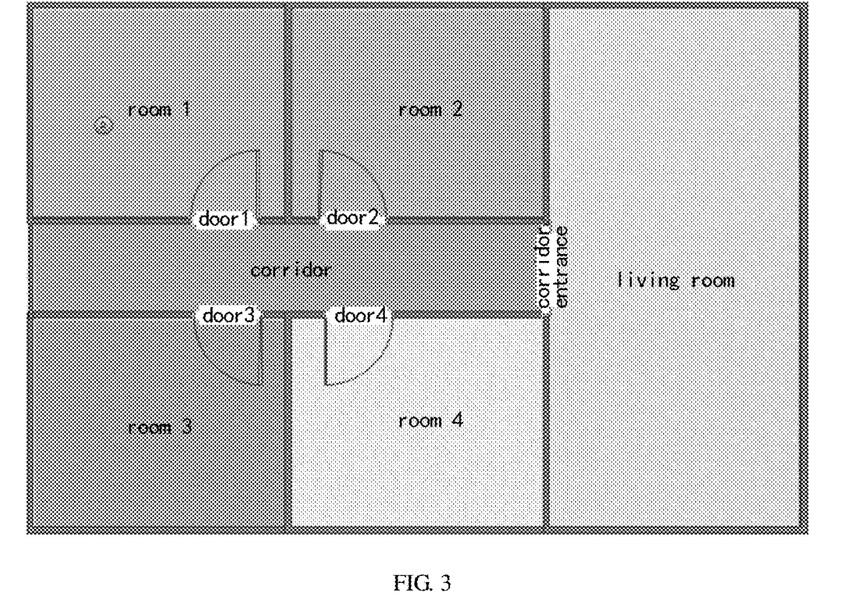
FIG. 3 is a schematic diagram illustrating an example of an indoor region topology map according to an embodiment of the present application.

When the robot D enters the strange environment for the first time, as shown in FIG. 3, the robot is randomly placed any where, in room 1 as shown schematically in FIG. 3, regardless of the manner in which it sweeps. If the cleaning is started in a bow-shaped manner, as shown in FIG. 4, whether a passage exists or not may be identified in real time during the work of the robot. When the robot works to the passage and when the robot determines that the room 1 is not cleaned completely, the robot returns to the starting position to complete the cleaning of the remaining part according to the cleaning strategy until the cleaning task of the room 1 is determined to be completed, the robot passes through the door 1, and the cleaning task of the next region (the corridor in FIG. 5) is carried out as shown in FIG. 5, where in the exemplary floor plan, the robot will enter the corridor to perform the sweeping task.

Figure 6:
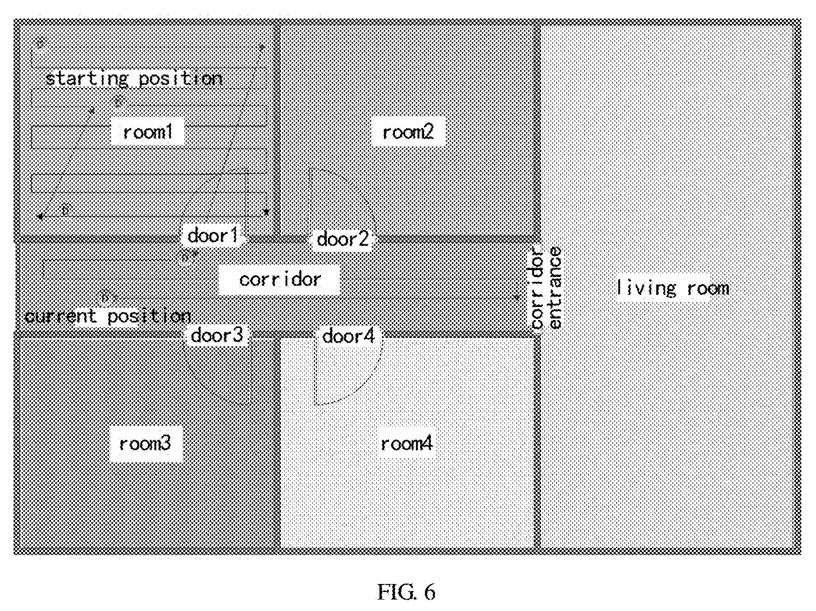
FIG. 6 is a schematic diagram of a robot working into a corridor region through a passage.

As shown in FIG. 6, when working in the corridor region, the robot may dynamically identify whether a passage exists in real time (such as doors 1-4, corridor entrance and the like shown in FIG. 6) and work to the corresponding passage.

When the corridor is not determined to be cleaned, the robot cannot pass through the passage and enter other regions, but the cleaning of the rest part may be completed according to the cleaning strategy, until it is determined that the sweeping task of the current region (i.e. the corridor region) is completed. Then the machine selects one region among the regions without sweeping according to the sweeping strategy, and then passes through the passage corresponding to the selected one region to perform the sweeping task of the next region.

The technical schemes provided by the embodiments of the present application may be applied to all household robot products (such as sweeping robots) with laser sensors. The technical schemes provided by the embodiments of the present application will be described below in conjunction with specific application scenarios.

When entering into an unfamiliar environment as shown in FIG. 10 for the first time, the robot D is randomly placed anywhere, such as a position in living room 6 as shown in FIG. 10, and starts cleaning in any manner. If the cleaning is performed in a bow-shaped manner, the robot D, during the cleaning process, may use the laser sensor to collect real-time environment information in the working environment, that is, two-dimensional point cloud data. The solid black line in FIG. 10 shows the wall, and the black dotted line represents the moving trajectory of the robot D. Based on the two-dimensional point cloud data collected by the laser sensor, a region grid map may be constructed, as shown in FIG. 10. In FIG. 10, since the room 5 and the living room 6 are not partitioned at the beginning, when the robot D moves to the passage (the gap shown in FIG. 10), the robot D may enter the room 5 to continue the cleaning task and continue to construct the grid map. Further, during the cleaning task of the room 5 by the robot D, if the passage between the room 5 and the living room 6 is collected again, the passage (such as a door opening) between the room 5 and the living room 6 may be identified according to the methods shown in FIG. 11 and FIG. 12.

Further, when the robot D works to the passage, if it is determined that the cleaning task in room 5 has not been finished, the passage blocking setting (such as setting a virtual wall) may be performed at the position of the passage in the grid map shown in FIG. 10, so as to continue the cleaning task in the room 5. When the cleaning task in the room 5 is completely finished, the robot D will enter the living room 6 through the passage to continue the cleaning task. The virtual wall has been described in the foregoing scenario embodiments, and will not be described repeatedly here.

In the foregoing embodiments, the robot capable of performing sweeping task (referred to as the sweeping robot) is taken as an example to describe the technical schemes of the present application, but it is not limited to the sweeping robot. The robot in the embodiments of the present application generally refers to any mechanical equipment capable of highly autonomously moving in an environment, for example, a sweeping robot, an escort robot or a guided robot, etc., or a purifier, unmanned vehicles, etc. Of course, the work tasks performed by different robots will be different, which is not limited herein.

Figure 7:
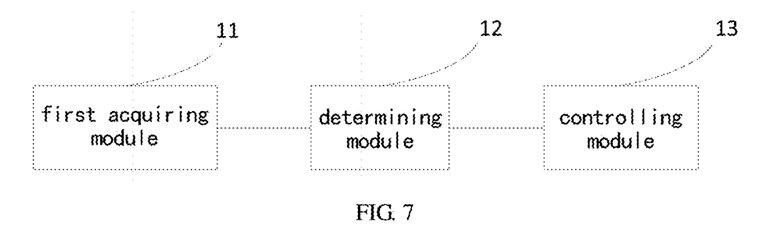
FIG. 7 is a schematic diagram illustrating a structure of a dynamic region division apparatus provided in an embodiment of the present application.

FIG. 7 is a schematic diagram illustrating the structure of a dynamic region division apparatus provided in an embodiment of the present application. As shown in FIG. 7, the apparatus includes: a first acquiring module 11, a determining module 12 and a complementing module 13, where the first acquiring module 11 is used for acquiring environment information collected by the robot when working in the first region; the determining module 12 is used for determining whether the robot has completed a work task in the first region, when a presence of a passage entering a second region is determined based on the environment information; and the complementing module 13 is used for complementing a boundary at the passage to block the passage, when the work task in the first region is not completed.

In the technical solution provided by the present embodiment, environment information collected by the robot when the robot works in the first region is acquired; the presence of the passage entering the second region is determined based on the environment information; and when it is determined that the robot does not complete the work task in the first region, the robot is prevented from entering the second region through the passage, thereby ensuring the principle that the robot may enter the next region to work only after the task in the single region has been completed, reducing the occurrence probability of repeated sweeping and miss sweeping, and improving the cleaning efficiency. In addition, the technical solution provided by the embodiment relies on the environment information acquired in real time, rather than relying on historical map data, so that the environmental adaptability is high.

Further, the environment information is a point cloud model; and the first acquiring module 11 is further used for: collecting an environment image, when of the robot works in the first region; identifying the environment image; and constructing the point cloud model for a surrounding environment of the robot by utilizing the SLAM technology, when an image conforming to a passage structure is identified in the environment image.

Further, the apparatus provided by the present embodiment further includes a second acquiring module and a determining module, where the second acquiring module is used for acquiring size information of a candidate structure conforming to the passage structure based on the point cloud model; and the determining module is used for determining that the candidate structure is the passage entering the second region, when the size information meets the preset size requirement.

Further, the size information includes: width, height and depth.

Further, the complementing module 13 is further used for: acquiring a region topology map and a position of the passage in the region topology map; and complementing the boundary to block the passage at the position in the region topology map.

Further, the complementing module 13 is further used for executing a passage open setting at the position in the region topology map when the work task in the first region is completed, so that the robot enters the second region through the passage.

Further, the apparatus provided by the present embodiment further includes a controlling module. The controlling module is used for: acquiring a work record of the robot in the first region; determining a continuation scheme according to the work record; and controlling the robot to continue working in the first region in accordance with the continuation scheme.

Further, the work record includes: working mode, starting position, starting orientation of the robot at the starting position and midway position monitored, when the robot works to the passage. Correspondingly, the controlling module is further used for: acquiring a region map of the first region; and determining the continuation scheme according to the region map, the working mode, the starting position, the starting orientation and the midway position.

Further, the controlling module is further used for: planning a path returning to the starting position according to the midway position; controlling the robot to work to return to the starting position in accordance with the path; adjusting a continuation orientation after the robot returns to the starting position again according to the starting orientation; and controlling the robot to continue working in the first region in the working mode along the continuation orientation from the starting position.

Further, the controlling module is further used for:

when the work task is completed, controlling the robot to move from an end position, when the work task is completed to the midway position, and controlling the robot to enter the second region through the passage after the robot arrives the midway position.

It should be noted here that: the dynamic region division apparatus provided by the above-mentioned embodiments may realize the technical solutions described in the above-mentioned method embodiments, and the principle of the specific implementation of the above-mentioned modules or units may refer to the corresponding contents in the above-mentioned dynamic region division method embodiments, which will not be described in detail here.

Figure 8:
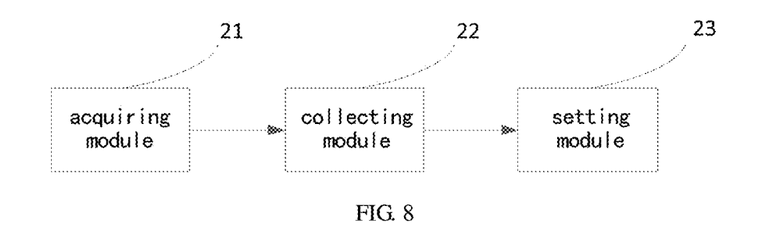
FIG. 8 is a schematic diagram illustrating a structure of a dynamic region division apparatus provided in another embodiment of the present application.

FIG. 8 is a schematic diagram showing the structure of the region division apparatus provided in an embodiment of the present application. As shown in FIG. 8, the region division apparatus includes: an acquiring module 21, a collecting module 22 and a setting module 23, where the acquiring module 21 is used for acquiring an environment image collected by a robot in a first region; the collecting module 22 is used for collecting environment information, when an image conforming to a passage structure is identified in the environment image; and the setting module 23 is used for executing passage blocking setting to divide the first region and the second region that are communicated through the passage when the presence of the passage entering the second region is determined based on the environment information.

In the technical solution provided by the embodiment, the environment image collected by the robot in the first region is acquired; the environment information is collected when the image conforming to the passage structure is identified in the environment image; and if the presence of the passage entering the second region is determined based on the environment information, the first region and the second region which are communicated through the passage are divided so as to perform working region dividing in real time, the occurrence probability of the robot shuttling back and forth across the region is reduced, the dynamic partition is realized and the cleaning efficiency is improved thereby.

Further, the setting module 23 is further used for: executing passage open setting to communicate the first region and the second region through the passage, when a passage open event is monitored.

Further, the region division apparatus provided by the present embodiment may further include a triggering module. The triggering module has at least one of:

triggering the passage open event, when it is determined that the robot has completed the task in the first region based on a task execution condition of the robot in the first region; and triggering the passage open event after receiving a passage open instruction input by a user.

Further, the environment information is a point cloud model. Accordingly, the acquiring module 22 is further used for constructing the point cloud model for a surrounding environment of the robot by utilizing SLAM technology.

It should be noted here that: the region division apparatus provided by the above-mentioned embodiments may realize the technical solutions described in the above-mentioned method embodiments, and the principles for realizing the specific implementation of the above-mentioned modules or units may refer to the corresponding contents in the above-mentioned region division method embodiments, which will not be described in detail here.

Figure 9:
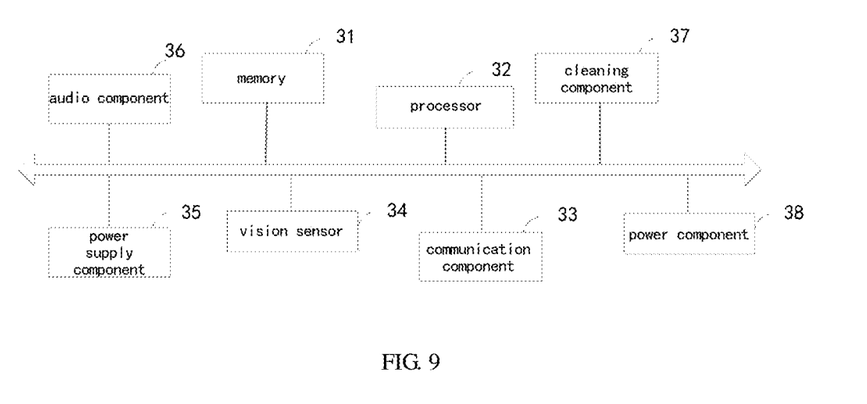
FIG. 9 is a schematic diagram illustrating a structure of a cleaning robot provided in an embodiment of the present application.

FIG. 9 illustrates a block diagram showing the structure of a cleaning robot provided by an embodiment of the present application. As shown in FIG. 9, the cleaning robot includes a memory 31 and a processor 32. The memory 31 may be configured to store various data to support operations on the cleaning robot. Examples of such data include instructions for any application or method operating on the cleaning robot. The memory 31 may be implemented by any type of volatile or nonvolatile memory device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The processor 32 is coupled with the memory 31 and used for executing the programs stored in the memory 31 so as to:

acquiring environment information collected by a robot when working in a first region;

determining whether the robot has completed a work task in the first region, when a presence of a passage entering a second region is determined based on the environment information; and complementing a boundary at the passage to block the passage, when the work task is not completed.

In the technical solution provided by the present embodiment, the environment information collected by the robot when the robot works in the first region is acquired; and the robot is prevented from entering the second region through the passage when the presence of the passage entering the second region is determined based on the environment information and it is determined that the robot does not complete the work task in the first region, thereby ensuring the principle that the robot may enter the next region to work only after the work task in the single region has been completed, reducing the occurrence probability of repeated sweeping and miss sweeping, and improving the cleaning efficiency. In addition, the technical solution provided by the present embodiment relies on the environment information collected in real time during work, rather than relying on historical map data, so that the environmental adaptability is high.

The processor 32, when executing the programs in the memory 31, may perform other functions in addition to those described above, with particular reference to the foregoing description of method embodiments.

Further, as shown in FIG. 9, the cleaning robot may further include: other components such as a communication component 33, a vision sensor 34, a power supply component 35, an audio component 36, a cleaning component 37, and a power component 38, etc. Only parts of components are schematically shown in FIG. 9, which does not mean that the cleaning robot includes merely the components shown in FIG. 9.

Correspondingly, the embodiments of the present application further provide a computer-readable storage medium stored with computer programs that, when executed by a computer, are capable of performing the steps or functions of the dynamic region division method provided by the above-described embodiments.

The present application further provides an embodiment of the cleaning robot. The structure of the cleaning robot provided by the embodiment is the same as that of the embodiment shown in FIG. 9, with the specific compositional structure shown in FIG. 9. The difference is that the processors have different functions. The cleaning robot provided by the embodiment includes a memory and a processor. The memory is used for storing programs. The processor is coupled with the memory and used for executing the programs stored in the memory so as to:

acquiring an environment image collected by the robot in the first region;

collecting environment information, when an image conforming to a passage structure is identified in the environment image; and executing passage blocking setting to divide the first region and a second region communicated through a passage, when a presence of the passage entering the second region is determined based on the environment information.

In the technical solution provided by the embodiment, the environment image collected by the robot in the first region is acquired; environment information is acquired when an image conforming to the passage structure is identified in the environment image; and if the presence of the passage entering the second region is determined based on the environment information, the first region and the second region communicated through the passage are divided so as to divide work area in real time, the occurrence probability of the robot shuttling back and forth across the region is reduced, the dynamic partition is realized and the cleaning efficiency is improved thereby.

The processor, when executing programs in the memory, may perform other functions in addition to those described above, with particular reference to the foregoing description of method embodiments.

Correspondingly, the embodiments of the present application also provide a computer-readable storage medium stored with computer programs that, when executed by a computer, is capable of performing the steps or functions of the dynamic region division method provided by the above-described embodiments.

Figure 11:
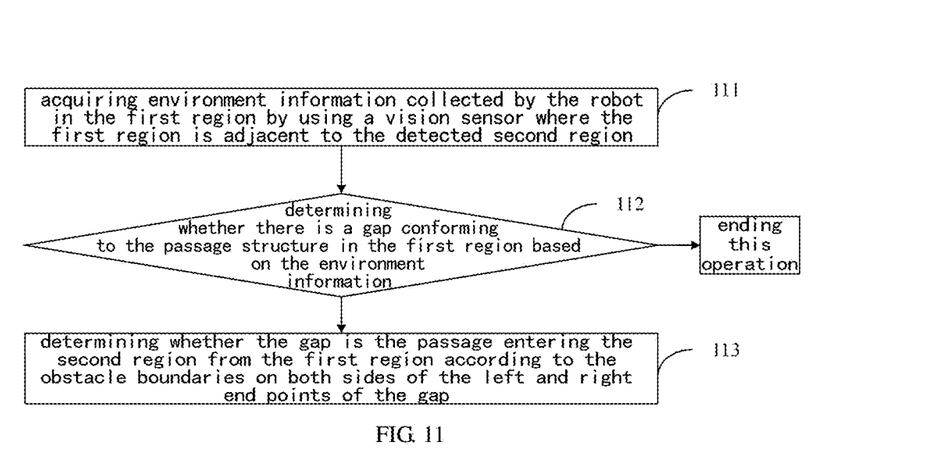
FIG. 11 is a schematic flowchart of a region passage identification method provided in an embodiment of the present application.

FIG. 11 is a schematic flowchart of a region passage identification method provided in an embodiment of the present application. This method includes:

111, acquiring the environment information collected by the robot in a first region by using the laser sensor, where the first region is adjacent to the detected second region;

112, identifying whether there is a gap conforming to the passage structure in the first region based on the environment information; if so, executing the step 113; otherwise, ending the operation; and

113, identifying whether the gap is a passage entering the second region from the first region in accordance with the obstacle boundaries on both sides of the left and right end points of the gap;

where the second region is a known region that robot has detected, and the detection mode of the robot for the second region is not limited.

If the robot is provided with a vision sensor, the position of the passage between the first region and the second region may be extracted visually, and then real-time partition may be carried out based on the position of the passage. However, for the robot provided with a vision sensor, for example for a robot only provided with a laser sensor, the position of the passage between the first region and the second region cannot be visually extracted.

Aiming at the above problems, the embodiment provides a region passage identification method. In the embodiment, a laser sensor is arranged on the robot, and the environment information, i.e., two-dimensional point cloud data, may be collected after the laser sensor scans obstacles in a plane. Based on the environment information, it may be determined whether there is a gap conforming to the passage structure in the first region. If the gap conforming to the passage structure exists, whether the gap is the passage entering the second region from the first region may be identified in accordance with the obstacle boundaries on both sides of the left and right end points of the gap. The embodiment solves the region passage identification problem faced by robots without any vision sensor.

In an optional embodiment, the implementation of step 112 includes: searching for obstacles in the front region of the robot based on the environment information; if adjacent obstacles are found in the front region, calculating the angle formed by the robot and the adjacent obstacle; calculating the distance between the adjacent obstacles if the angle is larger than a set angle threshold; and determining there is a gap conforming to the passage structure between the adjacent obstacles if the distance between the adjacent obstacles meets a set distance requirement.

In an optional embodiment, before determining that there is a gap conforming to the passage structure between the adjacent obstacles, the method further includes: calculating the number of obstacles in specified range around the gap; and assisting to determine whether the gap conforms to the passage structure in accordance with the number of obstacles in the specified range around the gap.

In an optional embodiment, the implementation of step 113 includes: determining whether the obstacle boundaries on both sides of the left and right end points of the gap are parallel or approximately parallel; and if the obstacle boundaries are parallel or approximate parallel, determining that the gap is the passage entering the second region from the first region.

Further, the determining whether the obstacle boundaries on both sides of the left and right end points of the gap are parallel or approximately parallel includes: calculating the slopes of the obstacle boundaries on both sides of the left and right end points of the gap; and if the slope difference of the obstacle boundaries on both sides of the left and right end points of the gap is within a set difference value range, determining that the obstacle boundaries on both sides of the left and right end points of the gap are not parallel or approximately parallel.

Further, before determining whether the obstacle boundaries on both sides of the left and right end points of the gap are parallel or approximately parallel, the method further includes: performing expansion and corrosion in a first set region range on both sides of the left and right end points of the gap, to obtain continuous obstacles on both sides of the left and right end points of the gap; and tracking the boundaries of the continuous obstacles on both sides of the left and right end points of the gap in a second set region range, to obtain the obstacle boundaries on both sides of the left and right end points of the gap.

Further, after it is determined that the obstacle boundaries on both sides of the left and right end points of the gap is not parallel or approximate parallel, and before it is determined that the gap is the passage entering the second region from the first region, the method further includes executing at least one of the following operations:

determining whether the vector of the obstacle boundary on at least one side of the gap, the vector of the intersection boundary of the second region and the vector of the undetected region adjacent to the second region are in the same direction;

determining whether the angle between the obstacle boundary on the at least one side of the gap and the intersection boundary of the second region is within a set angle range;

determining whether the tracking starting point of the intersection boundary of the second region and the robot are in a same communicated region;

determining whether the obstacles on both sides of the gap are the same obstacles; and if the results of the at least one determination operation are "yes", determining that the gap is the passage entering the second region from the first region.

The intersection boundary of the second region refers to the boundary between the second region and the undetected region adjacent thereto, and the boundary intersects with the left end point or the right end point of the gap. The vector of the obstacle boundary at the left side of the gap refers to the vector directing toward the right end point from the left end point of the gap; and the vector of the obstacle boundary on the right side of the gap refers to the vector directing toward the left end point from the right end point of the gap. Correspondingly, the vector of the intersection boundary of the second region on the left side of the gap refers to the vector directing toward the intersection boundary of the second region on the left side of the gap from the left end point of the gap; and the vector of the intersection boundary of the second region on the right side of the gap refers to the vector directing toward the intersection boundary of the second region on the right side of the gap from the right end point of the gap. Correspondingly, the vector of the undetected region adjacent to the second region on the left side of the gap refers to the vector directing toward the undetected region adjacent to the second region on the left side of the gap from the left end point of the gap; and the vector of the undetected region adjacent to the second region on the right side of the gap refers to the vector directing toward the undetected region adjacent to the second region on the right side of the gap from the right end point of the gap.

Further, after determining that the gap is the passage entering the second region from the first region, the method further includes: executing passage blocking setting to divide the first region and the second region in communication through the passage.

The detailed description of various steps or operations in the present embodiment may be found in the description in previous embodiments, which is not repeatedly described here.

The present application further provides an embodiment of a robot. The structure of the robot provided by the embodiment is the same as the embodiment shown in FIG. 9; and the specific compositional structure may be seen in FIG. 9. The difference is that the processors have different functions. The robot provided by the embodiment includes a memory and a processor. The memory is used for storing programs. The processor is coupled with the memory, and used for executing the programs stored in the memory, so as to:

acquire environment information collected by the robot in the first region by using the laser sensor, where the first region is adjacent to the detected second region;

identify whether there is a gap conforming to the passage structure based on the environment information; and if so, identifying whether the gap is the passage entering the second region from the first region in accordance with the obstacle boundaries on both sides of the left and right end points of the gap.

According to the technical scheme provided by the embodiment, the scheme of acquiring the environment information collected by the robot in the first region, identifying the gap conforming to the passage structure, and identifying whether the gap is the passage entering the second region from the first region in accordance with the obstacle boundaries on both sides of the left and right end points of the gap, solves the region passage identification problems. Further, after the passages among the regions are identified, the first region and the second region, which are communicated through the passage, are divided so as to divide the working area in real time, reduce the occurrence probability of the robot shuttling back and forth across the area, realize dynamic partition and improve the cleaning efficiency.

When the processor is executing the programs stored in the memory, other functions may be implemented in addition to those described above, particularly as described in the preceding method embodiments.

Correspondingly, the embodiment of the present application further provides a computer readable storage medium with shored computer programs. The computer programs, when being executed by a computer, may be executed to implement the steps and functions of the dynamic region division method provided by the above-mentioned embodiments.

The apparatus embodiments described above are merely illustrative, where the units described as separate components may or may not be physically separated, and the components displayed as units may or may not be physical units, i.e., may be located at a place, or may be distributed to multiple network units. Some or all of the modules may be selected according to actual needs to achieve the purpose of the scheme of this embodiment. Those of ordinary skill in the art may understand and implement without creative work.

Through the description of the above implementation modes, those skilled in the art may clearly understand that various implementation modes may be implemented by means of software and a necessary general hardware platform, and of course, by hardware. Based on such understanding, the essence of the foregoing technical solutions or portions making contribution to the prior art may be embodied in the form of software products. The computer software products may be stored in a computer-readable storage medium such as a ROM/RAM, a magnetic disk and an optical disc, including instructions for causing a computer device (which may be a personal computer, a server, or a network device, etc.) to perform the methods described in various embodiments or portions of the embodiments.

Finally, it should be noted that the above embodiments are only used to illustrate the technical solutions of the present invention, and are not limited thereto. Although the present invention has been described in detail with reference to the foregoing embodiments, those of ordinary skill in the art will understand that the technical solutions described in the foregoing embodiments may be still modified, or some technical features are equivalently replaced. These modifications or replacements do not make the essence of the corresponding technical solutions depart from the spirit and scope of the technical solutions in various embodiments of the present invention.

What is claimed is:

1. A dynamic region division method, comprising:
   acquiring environment information collected by a robot when working in a first region;
   determining whether the robot has completed a work task in the first region, when a presence of a passage entering a second region is determined based on the environment information; and
   complementing a boundary for preventing the robot from entering at the passage to block the passage, when the work task is not completed.

2. The method according to claim 1, wherein:
   the environment information is a point cloud model; and
   the acquiring the environment information collected by the robot when working in the first region comprises:
   collecting an environment image, when the robot works in the first region;
   identifying the environment image; and
   constructing the point cloud model for a surrounding environment of the robot by utilizing a Simultaneous Location and Mapping technology, when an image conforming to a passage structure is identified in the environment image.

3. The method according to claim 2, further comprising:
   acquiring size information of a candidate structure conforming to the passage structure based on the point cloud model; and
   determining that the candidate structure is the passage entering the second region, when the size information meets a preset size requirement.

4. The method according to claim 3, wherein the size information comprises:
   width, height and depth.

5. The method according to claim 1, wherein:
   the environment information is two-dimensional point cloud data collected by a laser sensor on the robot; and
   determining whether there is a passage entering the second region based on the environment information comprises:
   identifying whether there is a gap conforming to the passage structure in the first region based on the two-dimensional point cloud data; and
   identifying whether the gap is the passage entering the second region from the first region according to obstacle boundaries on both sides of the left and right end points of the gap, if there is a gap conforming to the passage structure.

6. The method according to claim 5, wherein the identifying whether there is a gap conforming to the passage structure in the first region based on the environment information comprises:
   searching for an obstacle in a front region of the robot based on the environment information;
   if adjacent obstacles are found in a front region, calculating an angle formed by the robot and the adjacent obstacles;
   calculating a distance between the adjacent obstacles if the angle is larger than a set angle threshold; and
   determining that there is a gap conforming to the passage structure between the adjacent obstacles if the distance between the adjacent obstacles meets a set distance requirement.

7. The method according to claim 6, wherein prior to determining that there is a gap conforming to the passage structure between the adjacent obstacles, further comprises:
   calculating a number of obstacles in specified range around the gap; and
   assisting to determine whether the gap conforms to the passage structure according to the number of the obstacles in the specified range around the gap.

8. The method according to claim 5, wherein the identifying whether the gap is the passage entering the second region from the first region according to the obstacle boundaries on both sides of the left and right end points of the gap comprises:
   determining whether the obstacle boundaries on both sides of the left and right end points of the gap are parallel or approximately parallel; and
   if the obstacle boundaries are parallel or approximately parallel, determining that the gap is the passage entering the second region from the first region.

9. The method according to claim 8, wherein the determining whether the obstacle boundaries on both sides of the left and right end points of the gap are parallel or approximately parallel comprises:
   calculating slopes of the obstacle boundaries on both sides of the left and right end points of the gap; and
   if a slope difference value of the obstacle boundaries on both sides of the left and right end points of the gap is within a set difference value range, determining that the obstacle boundaries on both sides of the left and right end points of the gap are not parallel or approximately parallel.

10. The method according to claim 1, wherein the complementing the boundary at the passage to block the passage comprises:
    acquiring a region topology map and a position of the passage in the region topology map; and
    complementing the boundary to block the passage at the position in the region topology map.

11. The method according to claim 10, further comprising:
    canceling the boundary complemented at the passage, when the work task is completed.

12. The method according to claim 1, wherein after the complementing the boundary at the passage to block the passage, when the work task is not completed further comprises:
    acquiring a work record of the robot in the first region;
    determining a continuation scheme according to the work record; and
    controlling the robot to continue working in the first region in accordance with the continuation scheme.

13. The method according to claim 12, wherein:
    the work record comprises:
    working mode, starting position, starting orientation of the robot at the starting position and midway position monitored, when the robot works to the passage; and
    the determining the continuation scheme according to the work record comprises:
    acquiring a region map of the first region; and
    determining the continuation scheme according to the region map, the working mode, the starting position, the starting orientation and the midway position.

14. The method according to claim 13, wherein the controlling the robot to continue working in the first region in accordance with the continuation scheme comprises:
    planning a path returning to the starting position according to the midway position;

controlling the robot to work to return to the starting position in accordance with the path;

adjusting a continuation orientation after the robot returns to the starting position again according to the starting orientation; and controlling the robot to continue working in the first region in the working mode along the continuation orientation from the starting position.

15. The method according to claim 14, further comprising:

when the work task is completed, controlling the robot to move from an end position, when the work task is completed to the midway position, and controlling the robot to enter the second region through the passage after the robot arrives the midway position.

16. A dynamic region division method, comprising:

acquiring an environment image collected by a robot in a first region;

collecting environment information, when an image conforming to a passage structure is identified in the environment image; and executing passage blocking setting to separate the first region and a second region interconnected through a passage, when a presence of the passage entering the second region is determined based on the environment information.

17. The method according to claim 16, further comprising:

executing passage open setting to interconnect the first region and the second region through the passage, when a passage open event is monitored.

18. The method according to claim 17, wherein a triggering mode of the passage open event comprises at least one of:

triggering the passage open event, when the robot completes the task in the first region based on a task execution condition of the robot in the first region; and triggering the passage open event after receiving a passage open instruction input by a user.

19. The method according to claim 16, wherein:

the environment information is a point cloud model; and the acquiring the environment information comprises:

constructing the point cloud model for a surrounding environment of the robot by utilizing a Simultaneous Localization and Mapping technology.

20. A cleaning robot, comprising:

a memory that is used for storing programs; and a processor that is coupled with the memory and is used for executing the programs stored in the memory so as to:

acquire environment information collected by a robot when working in a first region;

determine whether the robot has completed a work task in the first region, when a presence of a passage entering a second region is determined based on the environment information; and complement a boundary at the passage to block the passage, when the work task is not completed.

* * * * *